(12) United States Patent
Szénási et al.

(10) Patent No.: US 12,460,571 B2
(45) Date of Patent: Nov. 4, 2025

(54) COOLING MODULE FOR A MOTOR VEHICLE FOR COOLING A DRIVE UNIT OF THE MOTOR VEHICLE, AND MOTOR VEHICLE AND METHOD FOR ASSEMBLING A MOTOR VEHICLE

(71) Applicant: AUDI AG, Ingolstadt (DE)

(72) Inventors: László Zoltán Szénási, Győr (HU); Attila Ádám, Telki (HU)

(73) Assignee: AUDI AG, Ingolstadt (DE)

( * ) Notice: Subject to any disclaimer, the term of this patent is extended or adjusted under 35 U.S.C. 154(b) by 144 days.

(21) Appl. No.: 18/264,828

(22) PCT Filed: Mar. 22, 2022

(86) PCT No.: PCT/EP2022/057396
§ 371 (c)(1),
(2) Date: Aug. 9, 2023

(87) PCT Pub. No.: WO2022/200298
PCT Pub. Date: Sep. 29, 2022

(65) Prior Publication Data
US 2024/0052769 A1 Feb. 15, 2024

(30) Foreign Application Priority Data

Mar. 22, 2021 (DE) .......................... 102021106969.6

(51) Int. Cl.
*F01P 5/10* (2006.01)
*F01P 11/06* (2006.01)

(52) U.S. Cl.
CPC ........... *F01P 5/10* (2013.01); *F01P 2011/061* (2013.01)

(58) Field of Classification Search
CPC ... F01P 5/10; B60K 1/00; B60K 11/02; B60Y 2410/10
USPC ....................................................... 165/121
See application file for complete search history.

(56) References Cited

U.S. PATENT DOCUMENTS

| 10,272,767 | B1 * | 4/2019 | Tang .......................... F01P 5/10 |
| 10,665,908 | B2 | 5/2020 | Krull et al. |
| 2002/0148661 | A1 * | 10/2002 | Atsuumi ............... F04D 29/426 |
| | | | 180/190 |
| 2005/0217840 | A1 | 10/2005 | Dobler et al. |

(Continued)

FOREIGN PATENT DOCUMENTS

| CN | 207790290 U | 8/2018 |
| CN | 210553941 U | 5/2020 |

(Continued)

OTHER PUBLICATIONS

Office Action issued on Mar. 3, 2022, in corresponding German Application No. 10 2021 106 969.6, 16 pages.

(Continued)

*Primary Examiner* — Steve S Tanenbaum
(74) *Attorney, Agent, or Firm* — Maier & Maier, PLLC

(57) ABSTRACT

A cooling module for a motor vehicle for cooling at least one drive unit of the motor vehicle, having a cooling module housing which has a coolant reservoir for providing a liquid or gaseous cooling medium; a first interface unit for accommodating a predetermined pump unit; a second interface unit for accommodating a predetermined filter unit; and a third interface unit for accommodating a predetermined heat exchange unit.

15 Claims, 3 Drawing Sheets

(56) References Cited

U.S. PATENT DOCUMENTS

| | | | | |
|---|---|---|---|---|
| 2005/0263110 A1* | 12/2005 | Yasui | ............... | F02F 1/108 |
| | | | | 123/41.72 |
| 2012/0153718 A1 | 6/2012 | Rawlinson et al. | | |
| 2018/0347454 A1* | 12/2018 | Wiegemann | ........... | F01M 5/001 |
| 2021/0071679 A1* | 3/2021 | Pawellek | ............ | F04D 29/0473 |

FOREIGN PATENT DOCUMENTS

| | | |
|---|---|---|
| CN | 211995122 U | 11/2020 |
| DE | 10331216 B3 | 9/2004 |
| DE | 102009015414 A1 | 9/2010 |
| DE | 102012111967 A1 | 6/2014 |
| DE | 102013204766 A1 | 9/2014 |
| DE | 102016223209 A1 | 5/2018 |
| DE | 102018128480 A1 | 2/2020 |
| EP | 1201889 A1 | 5/2002 |
| EP | 3255262 A1 | 12/2017 |
| EP | 3670858 A1 | 6/2020 |
| FR | 2921593 A3 | 4/2009 |
| FR | 2925117 A1 | 6/2009 |
| FR | 2978109 A1 | 1/2013 |

OTHER PUBLICATIONS

Search Report and Written Opinion issued on Jul. 21, 2022, in corresponding International Application No. PCT/EP2022/057396, 22 pages.

* cited by examiner

COOLING MODULE FOR A MOTOR VEHICLE FOR COOLING A DRIVE UNIT OF THE MOTOR VEHICLE, AND MOTOR VEHICLE AND METHOD FOR ASSEMBLING A MOTOR VEHICLE

FIELD

The invention relates to a cooling module for a motor vehicle for cooling at least one drive unit of the motor vehicle. Furthermore, the invention relates to a motor vehicle with a corresponding cooling module. The invention also relates to a method for assembling a motor vehicle with a cooling module.

BACKGROUND

Vehicles with an internal combustion engine or an electric motor use complex cooling systems to cool the respective engine. For example, during the combustion of a fuel (diesel or gasoline), temperatures of up to 500 degrees Celsius are generated, which are harmful for the operation of the engine. Therefore, it is necessary to cool the engine, especially an internal combustion engine, to a predetermined operating temperature. For cooling, common cooling systems in motor vehicles have a cooling circuit in the engine compartment, with the cooling circuit conveying a coolant into the engine compartment. The coolant can absorb heat generated by the engine or by other engine components and dissipate it to the outside air, for example by means of a coolant radiator. The heat is thus circulated by means of the cooling circuit. The removal of heat through the coolant radiator (in particular arranged on the radiator grille) can be improved, for example, by additional mechanical or electrically driven fans. To keep the temperature of the coolant or the engine relatively constant, the coolant flow can be controlled by a thermostat.

For example, EP 3 670 858 A1 discloses an engine temperature control unit for pumping and/or distributing a heat transfer medium. With the aid of an actuator, the heat transfer medium (cooling water) of an engine such as an electric motor or an internal combustion engine can be controlled.

DE 10 2013 204 766 A1 discloses an electric vehicle axle device, wherein said device comprises a cooling circuit for cooling vehicle components.

DE 10 2018 128 480 A1 discloses a control method of a cooling system for a vehicle.

For example, a cooling system for a vehicle is further known from US 2012/0153718 A1, with which a cooling circuit for cooling an electric motor can be controlled.

A disadvantage of the known cooling systems of vehicles is that the components of the cooling systems are arranged in a wide variety of positions in or on the vehicle. This makes the integration of cooling systems in vehicles complex, since a separate installation space or mounting position must be defined for each component.

SUMMARY

Thus, the object of the present invention is to provide cooling systems of vehicles with which a simpler assembly is made possible.

An aspect of the invention relates to a cooling module for a motor vehicle for cooling at least one drive unit of the motor vehicle, having a cooling module housing comprising the following components:
a coolant reservoir for providing a liquid or gaseous cooling medium;
a first interface unit for accommodating a predetermined pump unit;
a second interface unit for accommodating a predetermined filter unit;
a third interface unit for accommodating a predetermined heat exchange unit.

With the aid of the cooling module according to the invention, a compact, universal and space-saving cooling system for a vehicle can be provided. In particular, the cooling module and especially the cooling module housing contain the interface units and the coolant reservoir. Thus, in addition to the coolant reservoir, the coolant housing contains all important interfaces for the corresponding components for carrying out a cooling operation or cooling process of the at least one drive unit (electric motor or internal combustion engine) of the motor vehicle. In other words, the cooling module housing of the cooling module is such that it can accommodate all the necessary components or units for carrying out the cooling process. For this purpose, the cooling module housing can contain the most varied interface units or interfaces for accommodating the corresponding components.

The possibility of accommodating or removing the components at the respective interfaces enables the cooling module housing of the cooling module to be mounted universally and flexibly in motor vehicles.

The cooling module can be integrated as an assembled unit in a space-saving manner in an engine compartment of the motor vehicle. In particular, the universal design of the cooling module makes it easier and less complicated to assemble, disassemble or replace. In particular, the cooling module can be removed from the motor vehicle at any time and used as a component in other vehicles. This means that the cooling module can be used universally in a wide variety of vehicle types or models.

The modular design of the cooling module offers advantages in terms of assembly and, in particular, the mounting steps involved in assembling the motor vehicle. Thus, in particular, the sequencing of the assembly of the motor vehicle can be improved. Furthermore, the cooling module according to the invention can achieve a high degree of integration in the most diverse motor vehicles, in particular in accessory components. In particular, the cooling module can be used as a standard part or as a COP (Carry of Parts) part.

In particular, the cooling module can be used in motor vehicles or in trucks or in vehicles with internal combustion engines or in hybrid vehicles or in electric vehicles.

The cooling module housing is designed in particular as a compact housing which is such that it can be placed in the vehicle engine compartment in a space-saving manner. With the aid of the coolant reservoir (coolant tank), the liquid or gaseous cooling medium (for example cooling water) or the most diverse types of cooling media for cooling the drive unit of the motor vehicle can be provided or stored.

For example, the first interface unit, the second interface unit and the third interface unit can be fastened or arranged on the cooling module housing in such a way that the specified units can be optimally accommodated in the cooling module housing according to their function and size. In particular, the interface units are positioned in such a way that the respective unit to be accommodated can be accommodated in such a way that the connection or arrangement of the units to be accommodated is as functional as possible. In particular, the cooling module according to the invention can be used to provide an integrated liquid-cooled system for cooling a drive unit of the motor vehicle.

An exemplary embodiment of the invention provides that the pump unit, the filter unit and the heat exchanger unit are arranged at the respective associated interface units of the cooling module housing. In other words, the pump unit, the filter unit and the heat exchanger unit are fastened to or integrated with the first interface unit, the second interface unit and the third interface unit, respectively. Thus, all components that are required to carry out the cooling process of the drive unit of the motor vehicle are installed or integrated or fastened to the cooling module housing.

In particular, the pump unit, the filter unit and the heat exchanger unit are fastened exclusively to the respective interface units of the cooling module housing. This allows the cooling module to be used in a compact and space-saving manner.

The pump unit (mechanically and/or electrically operated coolant pump or cooling water pump) is used to supply the liquid or gaseous coolant stored in the coolant reservoir to a cooling circuit. In particular, the pump unit serves to ensure a continuous, cyclic cooling circulation. The filter unit is in particular a filter (such as a particle filter) with which the cooling medium conveyed by the pump unit can be filtered for impurities and/or interfering objects. The heat exchanger unit is, for example, a heat exchanger or heat transducer. With the aid of the heat exchanger unit, the heat absorbed by the cooling medium from the drive unit of the motor vehicle can be used as thermal energy for heating a passenger compartment or vehicle interior of the motor vehicle. This means that the heat emitted by the drive unit can be reused. Thus, an improved efficiency can be achieved. In particular, the cooling module can be used not only to cool the drive unit, but also to simultaneously heat or warm the passenger compartment of the motor vehicle without requiring a large amount of energy. This results in a dual functionality of the cooling module.

In a further exemplary embodiment of the invention, it is provided that the cooling module housing has a further interface unit, wherein an electronic control unit can be arranged on the further interface unit and, in particular, the pump unit can be controlled with the electronic control unit. Thus, the cooling module housing can have at least one further interface unit in addition to the previously mentioned interface units. This allows the cooling module to be used in an even more universal and space-saving manner. If necessary, the cooling module housing can have further interface units, in particular a plurality of further interface units. Thus, the cooling module housing and thus also the cooling module can be expanded depending on the vehicle model and/or vehicle type and/or application. Thus, the cooling module can be provided more universally.

Optionally, the electronic control unit can be fastened to the further interface unit. In particular, the electronic control unit is exclusively fastened to the further interface unit. With the aid of the electronic control unit, the pump unit in particular can be controlled and/or regulated. Depending on the current state of the drive unit (with regard to the current temperature of the drive unit), the cooling power of the cooling module can be increased. Thus, for example, a flow rate of the cooling medium can be set or adjusted with the help of the electrical control unit. An electric motor (electric supply unit) can also be used to control the pump unit. Depending on the cooling capacity currently required, the power of the pump unit can be increased or decreased with the aid of this electric motor. For example, the electronic control unit can be designed as a control valve or contain at least one control valve. The control valve can be used to adjust the cooling medium flow.

Furthermore, the electronic control unit can include a cooling water regulator (thermostat). With this cooling water controller (thermostat), the water circulation (cooling medium circulation) can be controlled depending on a cooling medium temperature.

In a further exemplary embodiment, it is provided that the cooling module housing has a bearing interface, wherein a drive shaft unit of the motor vehicle can be arranged on the bearing interface for mounting the steering shaft unit. In particular, the bearing interface serves, in other words, to accommodate and firmly mount a drive shaft unit (drive shaft of the motor vehicle). Thus, the cooling module housing of the components for cooling the drive unit can have an additional function or functionality. The cooling module can be positioned or fastened in the engine compartment of the motor vehicle in such a way that the cooling module can additionally be used to support a drive shaft of the motor vehicle. Thus, the cooling module can be arranged in the engine compartment of the motor vehicle in an even more efficient and space-saving manner. The cooling module housing can accommodate the motor vehicle's drive shaft unit with the aid of the bearing interface, so that the drive shaft unit is movably fastened to the interface unit. As a result, additional fastening devices for at least one cardan shaft unit of the motor vehicle can be dispensed with, whereby the installation space of the engine compartment of the motor vehicle can be utilized more effectively.

In one exemplary embodiment, it is provided that a housing of the coolant reservoir is integrated at least in regions, in particular completely, into the cooling module housing. In other words, the coolant reservoir may already be an integral part of the cooling module housing. Thus, parts of the cooling module housing and parts of the housing of the coolant reservoir can be combined. In principle, the cooling module housing can already contain the housing of the coolant reservoir. In other words, the housing of the coolant container can already be integrated during the manufacturing process of the cooling module housing. Therefore, the cooling module housing can be designed to be even more compact and to save installation space.

As a result, the cooling module can be used even more universally in a wide variety of vehicles.

Specifically, the cooling module housing and the housing of the coolant reservoir can be one and the same housing. Therefore, in this case, the housing of the coolant reservoir is the same as the cooling module housing. Therefore, the interface units would be integrated on a common housing of the coolant reservoir and the cooling module.

In order to be able to use the cooling module in an even more space-saving and compact manner, it is further provided that the interface units of the cooling module housing are all arranged in a common half of the cooling module housing. By compactly arranging the interface units in a common half of the coolant housing, the shape of the coolant module housing and thus the shape of the coolant module can be kept compact. In other words, the interface units can be arranged or integrated or fastened to the cooling module housing in such a way that they are arranged compactly and immediately adjacent to each other. Consequently, the cooling module can be prevented from having parts that protrude far away. When designing the cooling module housing, care can be taken to ensure that the interface units are arranged efficiently on the cooling module housing, depending on the component location. When arranging the interface units on the cooling module housing, care may be taken to ensure that, depending on the installation situation and/or installation position in the motor vehicle, the respective geometries and/or conditions of the engine compartment are taken into account.

A further aspect of the invention relates to a motor vehicle with a cooling module according to an embodiment of the aspect described above. In particular, the embodiments or exemplary embodiments of the previously described aspect can be regarded as advantageous embodiments of the motor vehicle.

In particular, the motor vehicle includes the cooling module, wherein the at least one drive unit (internal combustion engine or electric motor) can be cooled with the aid of the cooling module. For this purpose, in particular the cooling module is designed in such a way that it is fastened or arranged or positioned in the engine compartment of the motor vehicle in a space-saving and universally usable manner. In particular, the cooling module can be designed in such a way that it is adapted to the respective vehicle type of the motor vehicle. Furthermore, the design of the cooling module can take into account a wide variety of requirement profiles, in particular with regard to the respective motor vehicle.

The motor vehicle may, for example, be a passenger car or a truck or a bus or an electric vehicle or a hybrid vehicle.

In an exemplary embodiment, it is provided that the cooling module is connected to the drive unit of the motor vehicle by means of a connection point of the cooling module housing. In other words, the connection point of the cooling module housing can be used to ensure that the cooling medium can be conveyed or pumped to the drive unit by means of the cooling module for cooling the drive unit. For example, the connection point can be provided with several fasteners so that the cooling module housing can be arranged in the region of the drive unit by means of several fasteners or fastening devices, in particular if the cooling module is directly thermally connected to the drive unit with the aid of the connection point. The cooling module housing can be fastened in a region of an engine compartment of the motor vehicle with the aid of the connection point of the cooling module housing or with a fastening device additional to the connection point. The cooling module housing can be fastened in such a way that it is detachably fastened to the motor vehicle. This means that the cooling module housing, and in particular the complete cooling module, can be removed and replaced at any time.

In particular, the connection point is designed as a mechanical device, which is arranged in particular on the cooling module housing. It is also conceivable that the connection point is a unit separate from the cooling module housing, with which the cooling module housing can be connected to the drive unit. For example, the connection point can consist of several individual parts, which are arranged along the cooling module housing.

In a further exemplary embodiment, it is provided that a cooling circuit of the drive unit of the motor vehicle is connected to cooling channels of the cooling module, so that the cooling medium of the cooling module can be supplied to the cooling circuit of the drive unit for cooling the drive unit. For example, the connection point can have several cooling channels, which are additionally connected to the cooling circuit of the drive unit by the connection of the cooling module to the drive unit. With the aid of the cooling channels of the cooling module, the cooling medium provided by the coolant reservoir can be made available to the cooling circuit. In particular, the pump unit pumps the cooling medium through the cooling channels and thus supplies it to the cooling circuit. In particular, the cooling circuit of the drive unit forms a closed circuit with the cooling channel of the cooling module. The cooling circuit is arranged in particular in the engine compartment and serves to absorb the heat of the drive unit or other components of the drive unit.

The cooling medium can be used to dissipate the heat from the drive unit. In order to be able to cool the cooling medium or dissipate the absorbed heat, the cooling circuit of the drive unit includes a coolant radiator (arranged on the radiator grille), with which the cooling medium can be discharged to the outside air or the outside environment of the motor vehicle. For example, one or more fans (mechanical or electrical) can be arranged on the coolant radiator, which are arranged in front of or behind the coolant radiator. Thus, an improved cooling process of the coolant can additionally be achieved. In particular, this process can be monitored with the aid of the cooling water controller (thermostat), since cooling of the cooling medium is only necessary when a predetermined temperature of the cooling medium is reached.

Another aspect of the invention relates to a method of assembling a motor vehicle with a cooling module according to any of the preceding aspects, wherein the pump unit, the filter unit, the heat exchanger unit and the coolant reservoir of the cooling module are simultaneously fastened in an engine compartment of the motor vehicle by fastening a cooling module housing of the cooling module with the pump unit, the filter unit, the heat exchanger unit and the coolant reservoir in the engine compartment. In particular, the proposed method can be used to mount a cooling module according to any of the preceding aspects and/or a further aspect thereof in a motor vehicle. In other words, the cooling module is united with the motor vehicle in an assembly process of the motor vehicle. In this process, the individual components of the cooling module (pump unit, filter unit, heat exchanger unit and coolant reservoir) are thereby fastened or integrated in the engine compartment of the motor vehicle by fastening these components to the cooling module housing. The cooling module housing, which contains the various interface units for accommodating the respective components, is fastened in the engine compartment of the motor vehicle, and thus the individual components, which are fastened to the respective interface unit, are also fastened in the engine compartment. Therefore, by simply mounting the cooling module housing in the engine compartment, all components of the cooling module can be integrated or fastened in the engine compartment at the same time. Therefore, an assembly process of the cooling module and in particular an assembly process of the motor vehicle can be carried out more efficiently.

In particular, advantageous embodiments and exemplary embodiments of one aspect can be considered as advantageous embodiments or exemplary embodiments of the other aspects, and vice versa.

The invention also includes further embodiments of the motor vehicle according to the invention and of the method according to the invention, which have features as already described in connection with developments of the cooling module according to the invention. For this reason, the corresponding developments of the motor vehicle according to the invention and of the method according to the invention are not described again here.

The motor vehicle according to the invention is preferably designed as a motor car, in particular as a passenger car or truck, or as a passenger bus or motorcycle.

The invention also includes combinations of the features of the described embodiments. Thus, the invention also encompasses realizations each having a combination of the features of several of the described embodiments, provided that the embodiments have not been described as mutually exclusive.

BRIEF DESCRIPTION OF THE FIGURES

Exemplary embodiments of the invention are described below. In particular.

DETAILED DESCRIPTION

The exemplary embodiments explained below are preferred embodiments of the invention. In the exemplary embodiments, the described components of the embodiments each represent individual features of the invention to be considered independently of one another, which also each independently further develop the invention.

Therefore, the disclosure is intended to include combinations of the features of the embodiments other than those shown. Furthermore, the described embodiments can also be supplemented by further of the already described features of the invention.

In the figures, identical reference signs denote elements with identical functions.

Figure 1:
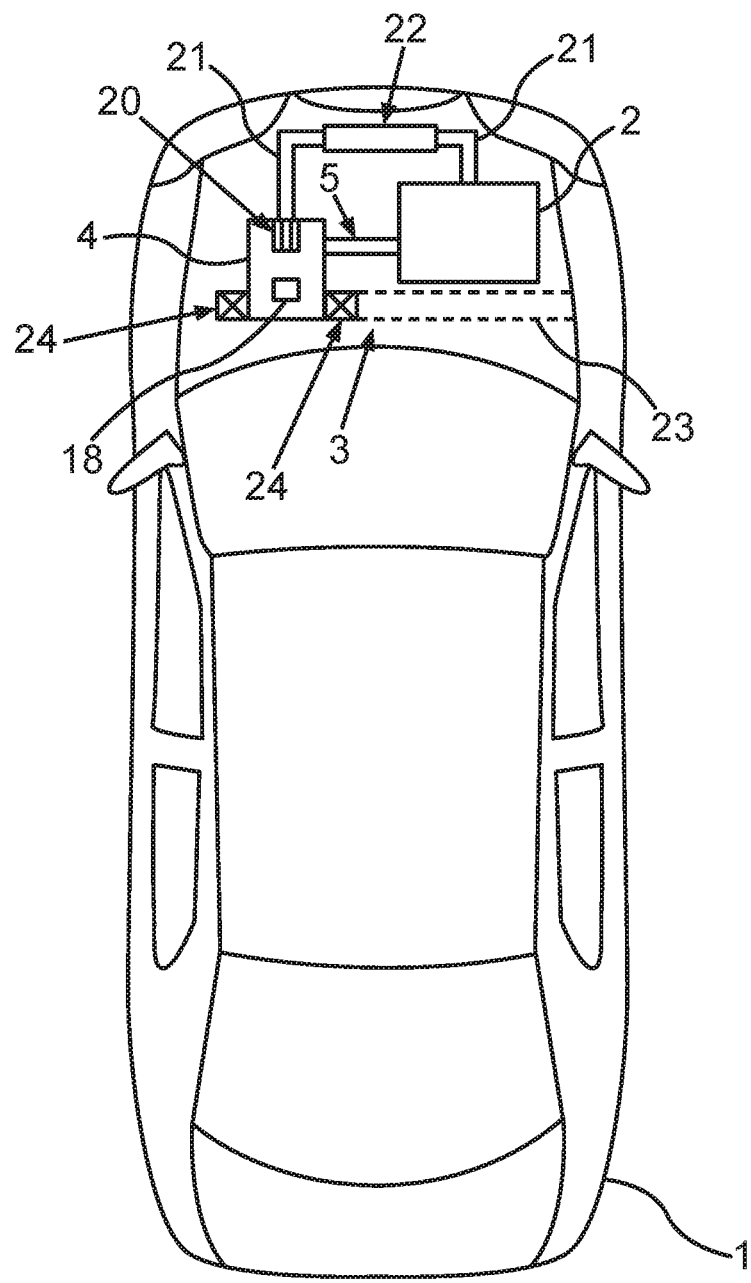
FIG. 1 shows a schematic representation of a motor vehicle with a cooling module.

FIG. 1 shows a motor vehicle 1 with at least one drive unit 2. The motor vehicle 1 may be a passenger car or a truck or an electric vehicle or a hybrid vehicle. The motor vehicle 1 can be driven with the aid of the drive unit 2 (internal combustion engine or electric motor). In this context, the drive unit 2 can be arranged in an engine compartment 3 of the motor vehicle 1.

During operation of the drive unit 2, the drive unit 2 generates a thermal heat quantity. In particular, the drive unit 2 may have temperatures up to 500 degrees Celsius. To prevent the drive unit 2 from being damaged by excessive temperatures, it is necessary to cool the drive unit 2. Now, in order to cool the drive unit 2, the cooling module 4 according to the invention can be used. The cooling module 4 can be connected or coupled to the drive unit 2 by means of a connection point 5 of a cooling module housing 6 (see FIG. 2). The cooling module 4 is thus arranged, fastened or integrated in the engine compartment 3.

In order for the cooling module 4 to be arranged in the engine compartment 3 in a space-saving manner, it is necessary for the cooling module 4 to be compact and designed to save installation space. This is achieved by integrating or accommodating all necessary components of the cooling module on the cooling module housing 6.

Figure 2:
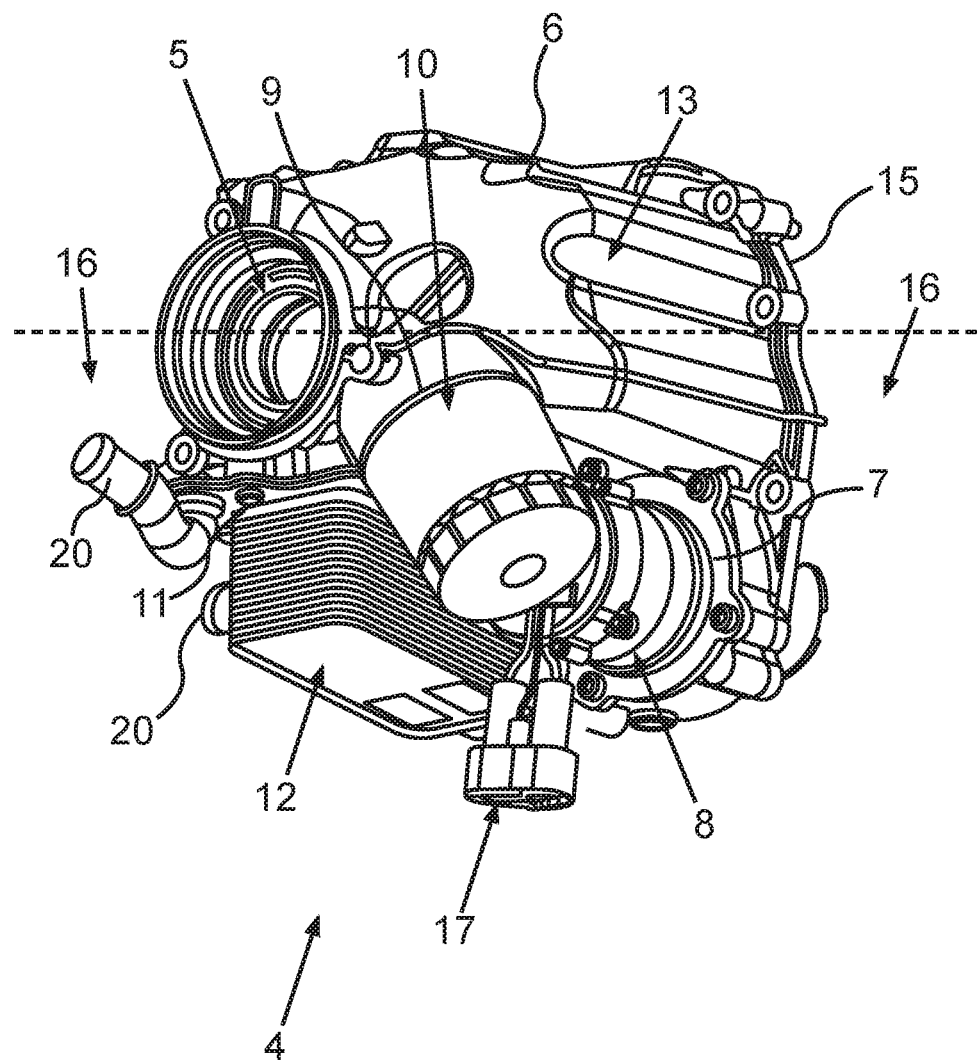
FIG. 2 shows an exemplary representation of the cooling module of FIG. 1.

FIG. 2 shows a possible embodiment of the cooling module 4. In order to make the cooling module 4 compact and, in particular, universally integrable, the cooling module housing 6 has a plurality of interface units. The cooling module housing 6 (which is designed, for example, as a mechanical housing) can have a first interface unit 7 for accommodating a predetermined pump unit 8. Thus, a coolant pump or water pump can be accommodated by means of the first interface unit. Furthermore, the cooling module housing 6 has a second interface unit 9 with which a predetermined filter unit 10 (filter) can be accommodated. Likewise, the cooling module housing 6 has a third interface unit 11 for accommodating a predetermined heat exchanger unit 12. Furthermore, in addition to the interface units 7, 9, 11, the cooling module housing 6 has a coolant reservoir 13 (coolant tank). The coolant reservoir 13 can be used to provide or store a liquid or gaseous cooling medium 14 (see FIG. 3). The cooling medium 14 can be, for example, cooling water or a mixture of water and coolant additive. With the aid of the cooling medium 14, the thermal energy (heat) generated in the drive unit 2 can be absorbed and transported away. Optionally, the cooling module 4 can be used or applied with a wide variety of cooling media, in particular those commonly used in vehicle technology. As a result, the cooling module 4 can be used universally.

The interface units 7, 9, 11 offer the advantage that in a basic state or raw state of the cooling module 4 the components 8, 10, 12 are not fastened to the cooling module 4. Thus, in particular, the advantages arise during assembly of the cooling module 4 in the motor vehicle 1. In particular, the cooling module 4 and, in particular, the cooling module housing 6 may have a plurality of interfaces, wherein the respective number of interfaces can be adapted to the respective place of use of the cooling module 4. For example, the cooling module housing 6 can have several blind interface units. Thus, a universally usable cooling module housing 6 can be manufactured and only depending on the type of vehicle and/or application, the corresponding interfaces can be activated and installed together with the respective components.

In order to be able to use the cooling module 4 in a compact and space-saving manner, a housing 15 of the coolant reservoir 13 can be integrated into the cooling module housing 6 at least in certain regions, in particular completely. Thus, the housing 15 of the coolant reservoir 13 and the cooling module housing 6 are virtually a single component or element. Therefore, the housing 15 of the coolant reservoir 13 can already be integrated during a manufacturing process of the cooling module housing 6. Therefore, for example, the cooling module housing 6 serves not only as a housing of the cooling module 4, but at the same time also as a housing 15 of the coolant reservoir 13. Thus, two different housings can be dispensed with, whereby the cooling module 4 can be manufactured in an even more compact and space-saving manner. Costs and manufacturing processes and manufacturing times can also be minimized or reduced as a result.

Likewise, the cooling module housing 6 can be two partial housings, so that at least one part can be used for the cooling module housing 6 per se and the other part as a housing 15 of the coolant reservoir 13. Thus, the cooling module housing 6 can be used in a variety of functional ways.

In order to be able to achieve a compact shape or a compact geometry of the cooling module 4, the interface units 7, 9, 11 may be arranged in a common half 16 of the cooling module housing 6. For example, all interface units 7, 9, 11 can be arranged in the upper or in the lower half of the cooling module housing 6. It is equally conceivable that all interface units 7, 9, 11 are arranged in a front or a rear region of the cooling module housing 6. The arrangement of the interface units 7, 9, 11 can be adapted taking into account the respective application of the cooling module 4 and/or the respective shape of the engine compartment 3 or the vehicle type of the motor vehicle 1. In particular, all interface units 7, 9, 11 should be arranged in such a way that the cooling module housing 6 has as compact a self-contained geometry or shape as possible. This means that the cooling module housing 6 should not have any strongly protruding components. Thus, the cooling module 4 can be positioned or arranged or fastened in a predetermined region in the engine compartment 6 in a space-saving manner.

For example, the cooling module housing 6 can have further interface units 17. For example, an electronic control unit 18 can be arranged or connected to the further or at least one further interface unit 17. The electronic control unit 18 can, for example, be a control valve or a cooling water regulator or a thermostat. The electronic control unit 18 can be used to control or actuate the pump unit 10. Accordingly, the electronic control unit 18 can be used to control a delivery rate of the pump unit 10 and thus a delivery rate of the cooling medium 14. In particular, the control unit 18 can be used to regulate a coolant flow or a coolant circulation. In particular, this control can be performed as a function of a temperature of the cooling medium 14. For example, the pump unit 8 can additionally be coupled or connected to an electric motor or electromechanical motor 19 via the further interface unit 17. Thus, the pump unit 8 can be supplied with voltage in dependence on the electronic control unit 18.

In order to be able to cool the drive unit 2 of the motor vehicle 1 efficiently, a closed coolant circuit must be established. On the one hand, this is done via the connection point 5, with which the cooling module 4 is connected to the drive unit 2. In order to be able to convey the cooling medium 14 from the cooling module 4 to the drive unit 2 for the cooling process of the drive unit 2, the cooling module 4 has cooling channels 20. Consequently, the cooling module 4 additionally contains integrated cooling channels so that the cooling medium 14 can be efficiently provided to the drive unit 2. This is done, in particular, by connecting or coupling a cooling circuit 21 of the drive unit 2 of the motor vehicle 1 to the cooling channels 20 of the cooling module 4. Thus, the cooling medium 14 can be supplied to the cooling circuit 21 with the aid of the pump unit 8. Accordingly, a self-contained cooling circuit for cooling the drive unit 2 is closed in a simple and efficient manner. In particular, the cooling medium 14 can circulate in the cooling circuit 21 for cooling the drive unit 2 until the cooling medium 14 has a predetermined temperature. If this is the case, then by means of a coolant radiator 22 of the motor vehicle 1 the heat of the cooling medium 14 is dissipated to the external environment or the external air in the vicinity of the motor vehicle 1. This takes place as in conventional motor vehicles in the region of the radiator grille of the motor vehicle 1. In order to be able to cool down the cooling medium 14 even more efficiently and quickly, additional fans (electrically or mechanically operated) can be used.

To prevent the cooling medium 14 from already starting to boil at 100 degrees, the cooling medium 14 in the cooling channels 20 and in the cooling circuit 21 is kept under a predetermined constant pressure. In this way, it can be achieved, for example, that the increased pressure in the cooling circuit 21 causes the cooling medium (for example water) only to start boiling between 115 degrees Celsius and 130 degrees Celsius. Thus, the cooling medium 14 can circulate longer in the cooling circuit 21.

As an additional functionality, the cooling module 4 can be used as a bearing of a cardan shaft unit 23 of the motor vehicle 1. The cardan shaft unit 23 is in particular a cardan shaft of the motor vehicle 1. In order to be able to fulfil this functionality, the cooling module housing 6 additionally has a bearing interface 24. By means of this bearing interface 24, the cooling module housing 6 can provide the additional functionality of the bearing of the cardan shaft unit 23. At this bearing interface 24, in particular at several bearing interfaces, a cardan shaft of the motor vehicle 1 in particular can be movably mounted. In particular, the cardan shaft or the cardan shaft unit 23 is fastened to the bearing interface 24 in a freely movable manner. Thus, the engine compartment 3 of the motor vehicle 1 can be made more compact, since additional fastening devices for the drive shaft unit 23 can be dispensed with.

Figure 3:
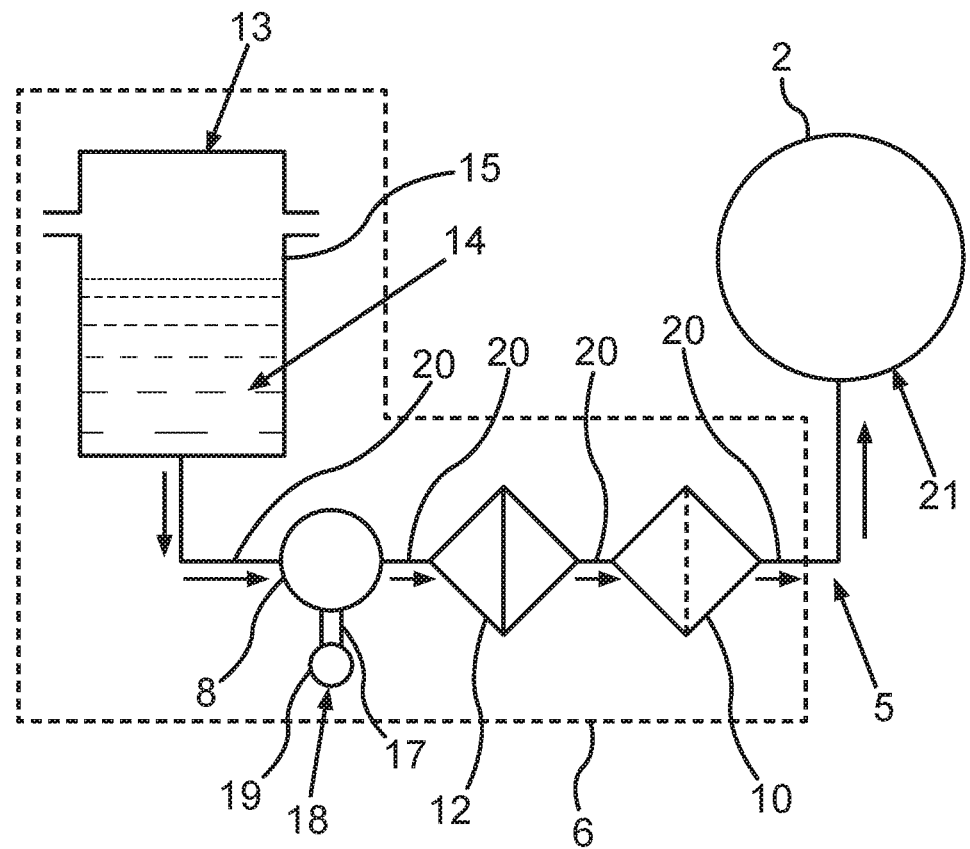
FIG. 3 shows a further schematic representation of the cooling module from FIG. 1.

For clarification purposes, FIG. 3 shows a schematic block diagram of the cooling module 4. It shows, for example, the arrangement or the arrangement in a functional chain of the individual components. The cooling medium 14 can be pumped or directed from the coolant reservoir 13 in the direction of the heat exchanger 12 via the cooling channels 20 with the aid of the pump unit 8. The cooling medium 14 is then filtered by the filter unit 10 and then supplied or made available to the cooling circuit 21 or the drive unit 2 via the connection point 5. In this way, in particular, a self-contained cooling circuit can be ensured.

In order to be able to use a unit (cooling module 4) that is as compact as possible, self-contained and universally applicable, the components (pump unit 8, filter unit 10 and heat exchanger unit 12) can be fastened exclusively to the respective associated interface units 7, 9, 11. This is particularly advantageous when mounting the cooling module 4 in the motor vehicle 1. In this way, a compact unit can be provided which can be easily integrated into a wide variety of vehicle models or vehicle types in a space-saving manner. The interface units also offer the advantage that the individual units can be replaced without major conversion or repair work. This means that the individual components can be easily replaced or exchanged at any time in the event of a defect or during maintenance. Another advantage is that with the integrated universally usable unit (cooling module) the cooling module can be easily dismounted when the motor vehicle 1 is disassembled and can be used again in another motor vehicle.

Therefore, with the aid of the cooling module 4, an integrated liquid-cooled system for cooling the drive unit 2 can be provided.

Overall, the examples show how an integrated liquid-cooled system can be provided.

The invention claimed is:

1. A cooling module for a motor vehicle for cooling at least one drive unit of the motor vehicle, comprising:
 a cooling module housing which has the following components:
 a coolant reservoir for providing a liquid or gaseous cooling medium;
 a first interface unit for accommodating a pump unit;
 a second interface unit for accommodating a filter unit; and
 a third interface unit for accommodating a heat exchange unit;
 wherein the pump unit, the filter unit and the heat exchange unit are arranged at the respective associated interface units of the cooling module housing; and
 wherein the interface units of the cooling module housing are all arranged in a common half of the cooling module housing.

2. The cooling module according to claim 1, wherein the cooling module housing has a further interface unit, wherein an electronic control unit is arranged on the further interface unit, and wherein the pump unit is configured to be controlled by the electronic control unit.

3. The cooling module according to claim 2, wherein the cooling module housing has a bearing interface, wherein a cardan shaft unit of the motor vehicle is configured to be arranged on the bearing interface for supporting the cardan shaft unit.

4. The cooling module according to claim 2, wherein a housing of the coolant reservoir is integrated at least in part into the cooling module housing.

5. The cooling module according to claim 2, wherein the interface units of the cooling module housing are all arranged in a common half of the cooling module housing.

6. The cooling module according to claim 1, wherein the cooling module housing has a bearing interface, wherein a cardan shaft unit of the motor vehicle is configured to be arranged on the bearing interface for supporting the cardan shaft unit.

7. The cooling module according to claim 6, wherein a housing of the coolant reservoir is integrated at least in part into the cooling module housing.

8. The cooling module according to claim 6, wherein the interface units of the cooling module housing are all arranged in a common half of the cooling module housing.

9. The cooling module according to claim 1, wherein a housing of the coolant reservoir is integrated at least in part into the cooling module housing.

10. The cooling module according to claim 9, wherein the interface units of the cooling module housing are all arranged in a common half of the cooling module housing.

11. A motor vehicle with a cooling module according to claim 1.

12. The motor vehicle according to claim 11, wherein a cooling circuit of the drive unit of the motor vehicle is connected to cooling channels of the cooling module, so that the cooling medium of the cooling module can be supplied to the cooling circuit of the drive unit for cooling the drive unit.

13. The motor vehicle according to claim 11 wherein the cooling module is connected to the drive unit of the motor vehicle by means of a connection point of the cooling module housing.

14. The motor vehicle according to claim 13, wherein a cooling circuit of the drive unit of the motor vehicle is connected to cooling channels of the cooling module, so that the cooling medium of the cooling module can be supplied to the cooling circuit of the drive unit for cooling the drive unit.

15. A method of assembling the motor vehicle with the cooling module according to claim 1, comprising: simultaneously mounting the pump unit, the filter unit, the heat exchanger unit and the coolant reservoir of the cooling module in an engine compartment of the motor vehicle by fastening the cooling module housing of the cooling module with the pump unit, the filter unit, the heat exchanger unit and the coolant reservoir in the engine compartment.

* * * * *